United States Patent
Kijimoto et al.

(10) Patent No.: US 8,875,619 B2
(45) Date of Patent: Nov. 4, 2014

(54) FRYER

(75) Inventors: Hideki Kijimoto, Nagoya (JP);
Tsuneyasu Hayakawa, Nagoya (JP)

(73) Assignee: Paloma Co., Ltd., Nagoya-Shi (JP)

( * ) Notice: Subject to any disclaimer, the term of this patent is extended or adjusted under 35 U.S.C. 154(b) by 147 days.

(21) Appl. No.: 13/043,822

(22) Filed: Mar. 9, 2011

(65) Prior Publication Data
US 2011/0232502 A1  Sep. 29, 2011

(30) Foreign Application Priority Data

Mar. 25, 2010 (JP) ................................ 2010-070651

(51) Int. Cl.
*A47J 37/12* (2006.01)
(52) U.S. Cl.
CPC .......... *A47J 37/1247* (2013.01); *A47J 37/1252* (2013.01)
USPC .............................................. 99/403; 99/409
(58) Field of Classification Search
CPC ........... A47J 37/12; A47J 20/20; A47J 27/04; A47J 27/1219; A47J 27/1228; A47J 27/1223; A47J 27/1285; A47J 27/047; A47J 27/1295
USPC .................. 99/403, 407, 408, 409, 410, 415; 126/19.5, 344, 357.1, 360.1, 360.2, 126/362.1, 364.1, 367.1, 369.1, 377.1; 138/111, 38; 165/74, 80.5, 104.19, 165/104.22, 164, 177, 219; 219/385, 530, 219/520, 534, 628, 629, 643
See application file for complete search history.

(56) References Cited

U.S. PATENT DOCUMENTS

| 4,848,318 A | * | 7/1989 | Brewer ....................... 126/376.1 |
| 4,947,824 A | * | 8/1990 | Ejiri et al. .................. 126/391.1 |
| 5,809,995 A | * | 9/1998 | Kobayashi et al. ........ 126/376.1 |
| 5,819,638 A | * | 10/1998 | Yokoyama ....................... 99/330 |
| 7,141,764 B1 | * | 11/2006 | Shumate ......................... 219/430 |
| 2009/0013877 A1 | * | 1/2009 | Lackman et al. ............... 99/403 |
| 2009/0090352 A1 | | 4/2009 | Chikazawa et al. |
| 2009/0107344 A1 | * | 4/2009 | Bivens ............................ 99/408 |
| 2010/0000418 A1 | * | 1/2010 | Payen et al. ..................... 99/341 |

FOREIGN PATENT DOCUMENTS

| JP | 2001-137131 A1 | 5/2001 |
| JP | 2005-176922 A1 | 7/2005 |
| JP | 2009-092302 A1 | 4/2009 |

OTHER PUBLICATIONS

Japanese Office Action dated Mar. 21, 2012.

\* cited by examiner

*Primary Examiner* — Henry Yuen
*Assistant Examiner* — Michael Laflame, Jr.
(74) *Attorney, Agent, or Firm* — Burr & Brown, PLLC

(57) ABSTRACT

A fryer, having respective tail pipes of a pulse combustor including: a forward pipe that extends outward and obliquely upward from a left or right side surface of a combustion chamber to reach an inside of a cooking zone, and bends in a C-shape along an inner surface of an oil bath, which is divided into left and right halves, with a return pipe mutually connected to the forward pipe in a U-shape in the back side center of the oil bath. The pipe then bends in a C-shape parallel to the forward pipe along the inner surface, which is divided into left and right halves, and from the upper left or right of the combustion chamber to reach an air chamber whereby in the oil bath, a cooking zone in which cooking oil is heated by the surrounding tail pipes is formed.

7 Claims, 6 Drawing Sheets

FRYER

BACKGROUND OF THE INVENTION

This application claims the entire benefit of Japanese Patent Application Number 2010-070651 filed on Mar. 25, 2010, the entirety of which is incorporated by reference.

FIELD OF THE INVENTION

The present invention relates to a fryer that heats cooking oil contained in an oil bath to cook food materials.

DETAILED DESCRIPTION OF THE INVENTION

A fryer heats an oil bath containing cooking oil to cook food materials such as a potato and a chicken. To heat the oil bath, there has been used a pulse combustor as described in Japanese Unexamined Patent Application Publication Number 2005-176922A. The Publication describes a pulse combustion chamber connected with a tail pipe which is bent to be a continuous U shape, and serves as a heat exchange part. The conventional pulse combustor repeatedly performs operation of: intermittently combusting a gas mixture of fuel gas and combusting air in the combustion chamber; forcibly discharging exhaust gas by a pressure rise in the combustion chamber associated with the combustion; and sucking the fuel gas and combusting air into the combustion chamber that is depressurize by the exhaust gas discharge, and by the ON/OFF operation of the pulse combustor, cooking oil is heated to a cooking temperature to keep the cooking temperature.

SUMMARY OF INVENTION

However, in the case of using the pulse combustor as heating means, the tail pipe serving as the heat exchange part is placed in an entire lower part of the oil bath, which makes it difficult to clean accumulated fry residues at the bottom of the oil bath. Due to an upward flow generated in the oil bath during cooking, the fry residues are floated up, and may be attached to food materials which may cause poor quality of the food. Further, as a temperature variation is likely to occur in the oil bath, cooking of food materials becomes uneven, which also causes deterioration of the food quality.

The above mentioned problems may occur even in the case of other heating means placed in the lower part of the oil tank, such as an immersion pipe burner or an electric heater.

It is therefore an object of the present invention to provide a fryer that, even in the case of disposing a heat exchange part in an oil bath, enables the oil bath to be easily cleaned, and eliminates a temperature variation so that good quality of food can be kept.

In order to accomplish the above object, a first aspect of the present invention is a fryer in which a heat exchange part is placed along an inner surface of an oil bath, a cooking zone in which cooking oil is heated by the surrounding heat exchange part is formed in the oil bath.

A second aspect of the present invention is a fryer, in a configuration of the first aspect, wherein the heating device includes: a combustion chamber provided in the oil bath, combusting gas mixture of fuel gas and air; and a pulse combustor connected to the combustion chamber including a tail pipe through which exhaust gas is discharged. The tail pipe is placed in a meandering shape so as to extend forward and backward and runs in S shape at least one time along the inner surface of the oil bath in a circumferential direction thereof.

A third aspect of the present invention is a fryer, in a configuration of the second aspect, where a deep-bottomed cold zone is formed on a lower side of the cooking zone in the oil bath, and the combustion chamber is arranged in the cold zone.

According to the first aspect of the present invention, even in the case where a heat exchange part is placed in the oil bath, it is easy to clean the oil bath. Further, a temperature variation is unlikely to occur and fry residues are not likely to attach, which improves the quality of cooking.

According to the second aspect of the present invention, in addition to the effect of the first aspect, the cooking zone can be more uniformly heated by the tail pipe extending around in the oil bath in the meandering shape.

According to the third aspect of the present invention, in addition to the effect of the second aspect, even in the case of using the pulse combustor as the heating means, the cooking zone can be utilized as a heating region for food materials as much as possible, since the combustion chamber is not positioned in the cooking zone. It is obvious that an inside of the cold zone can also be easily cleaned.

DESCRIPTION OF EMBODIMENTS

Embodiments of the present invention will hereinafter be described on the basis of the drawings.

Figure 1:
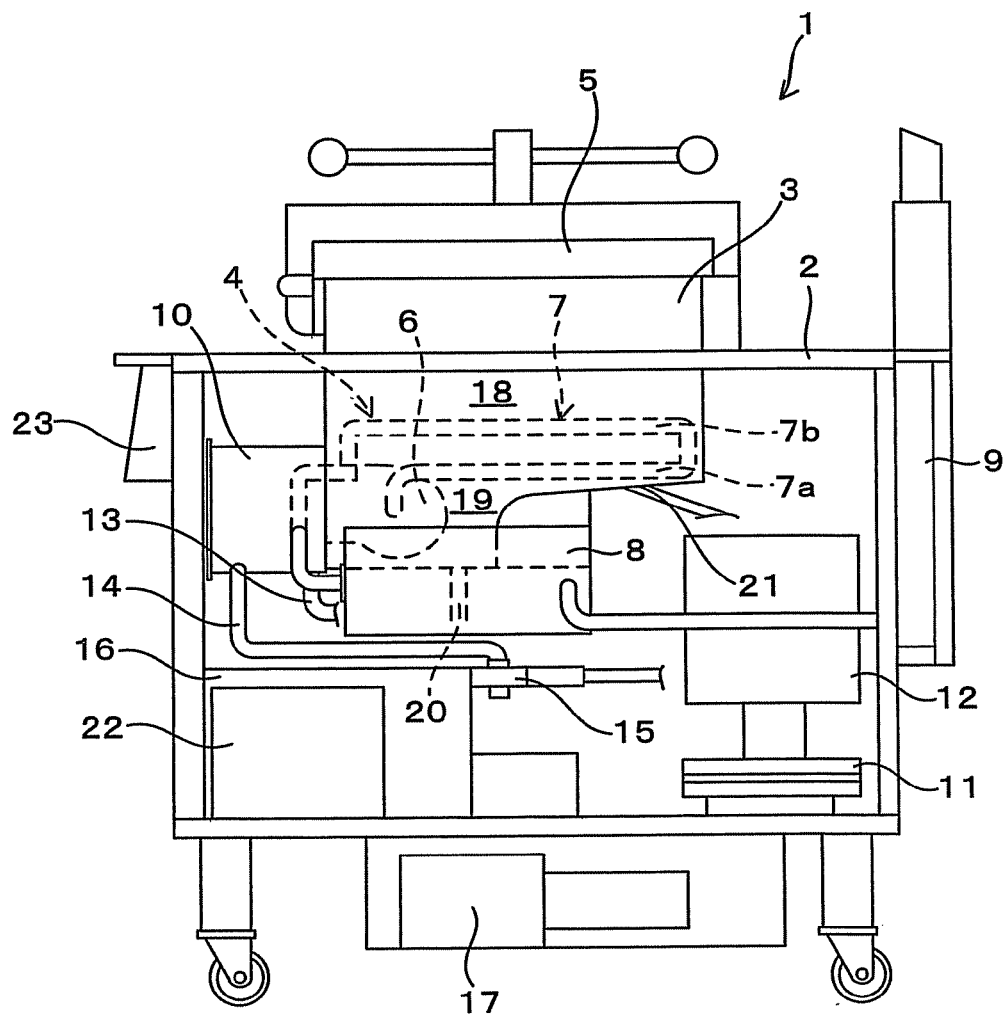
FIG. 1 is a schematic diagram of a pressure fryer.
Figure 2:
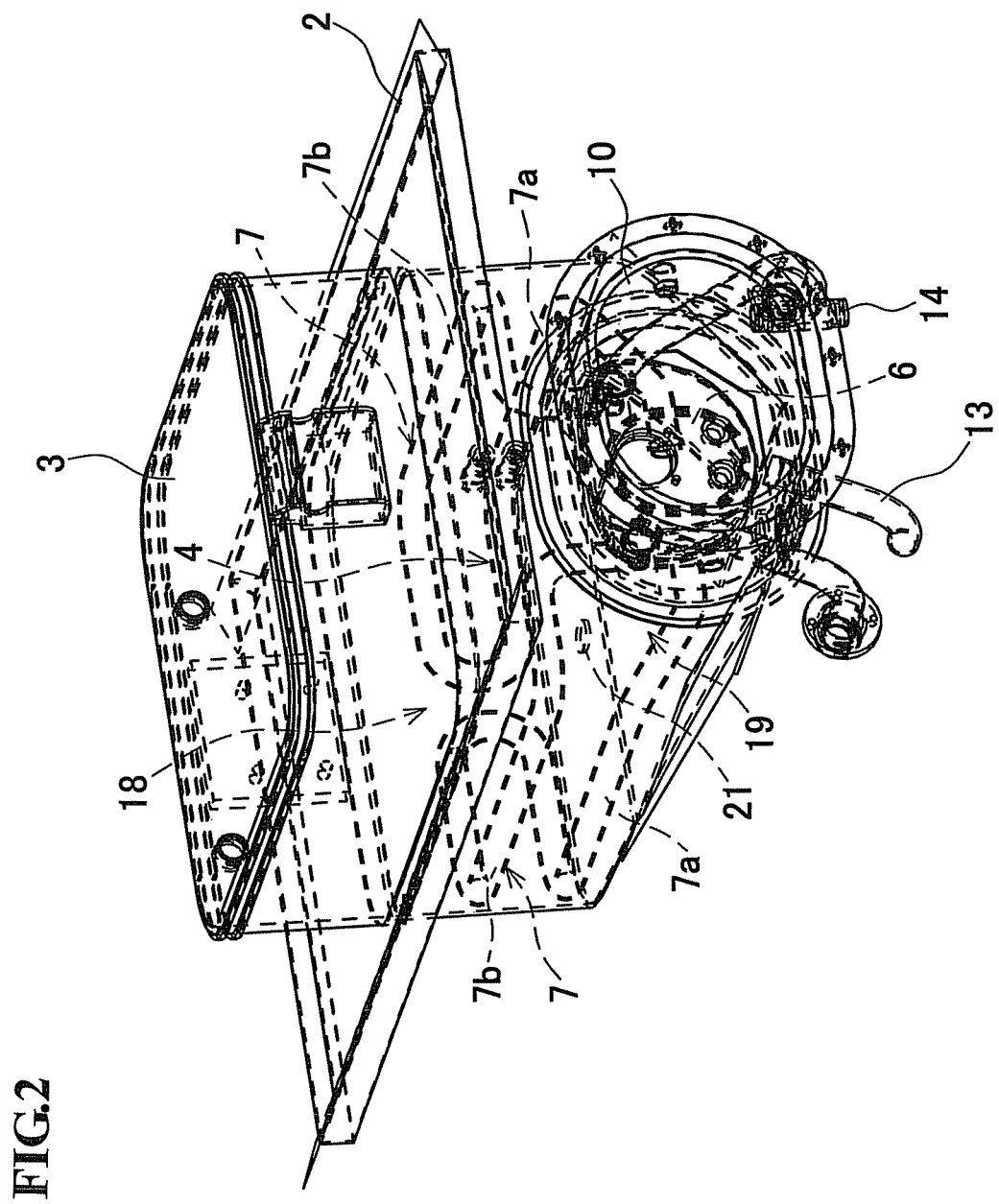
FIG. 2 is a perspective view of an oil bath unit.
Figure 3:
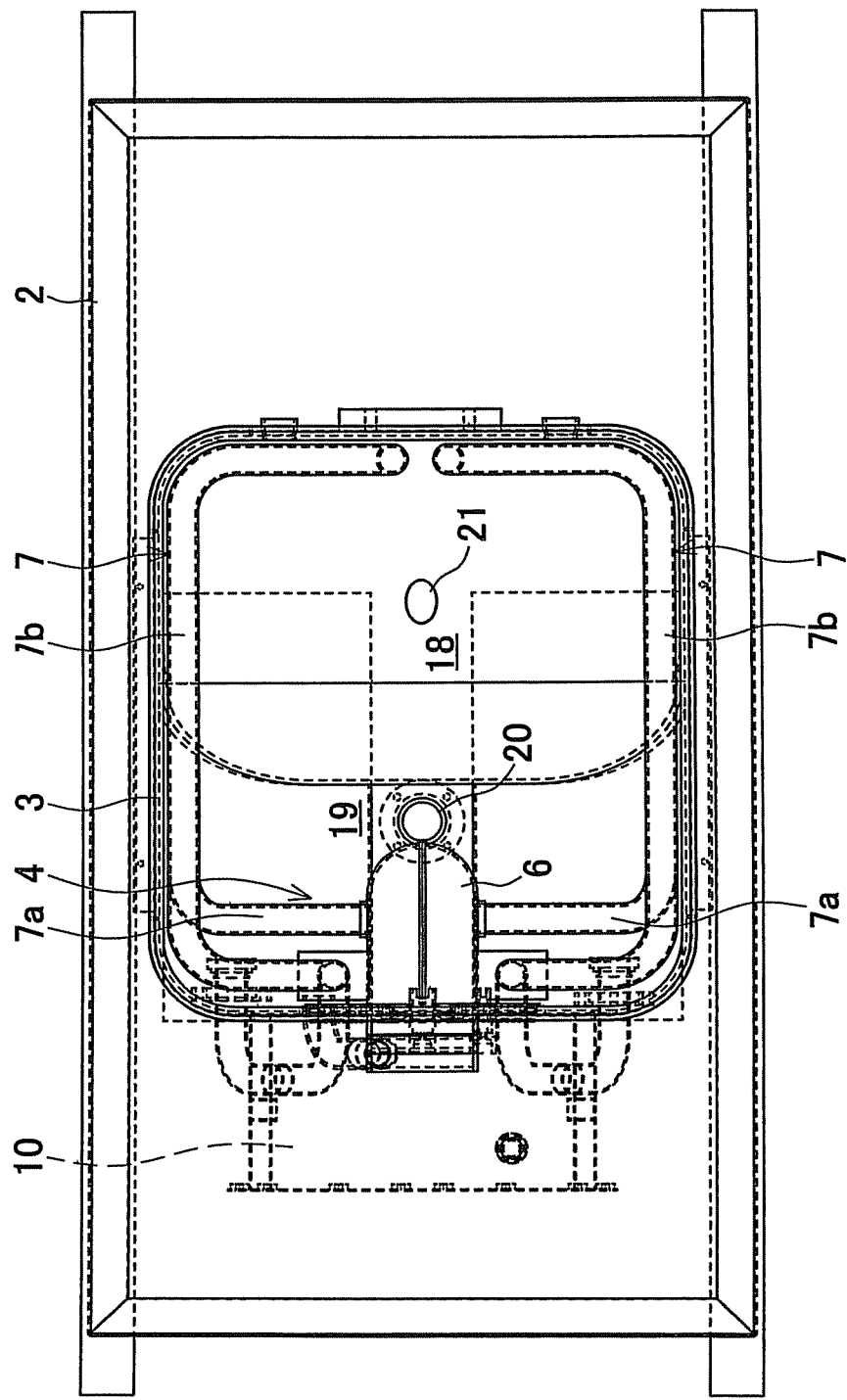
FIG. 3 is a plan view of the oil bath unit.
Figure 4:
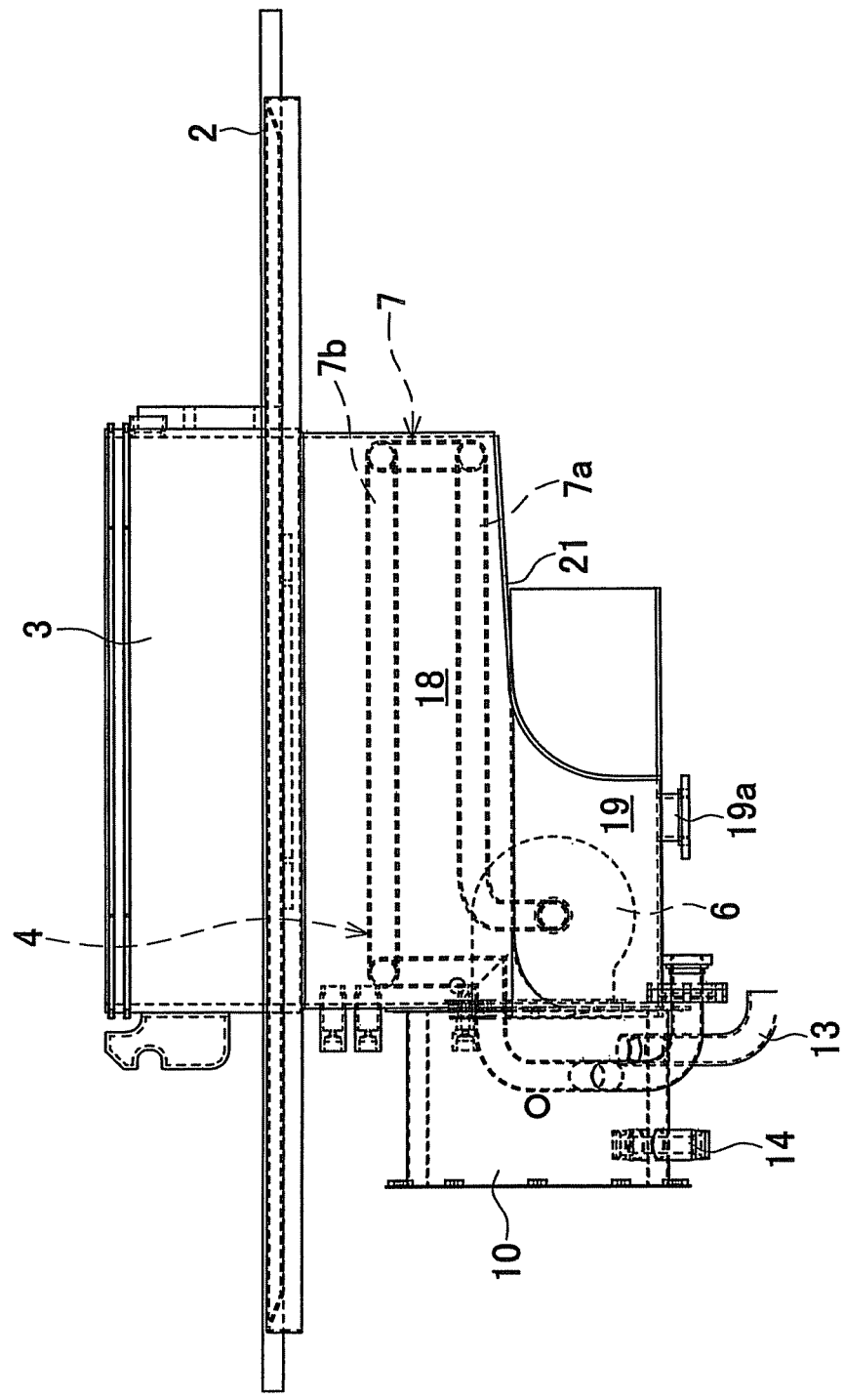
FIG. 4 is a side view of the oil bath unit.
Figure 5:
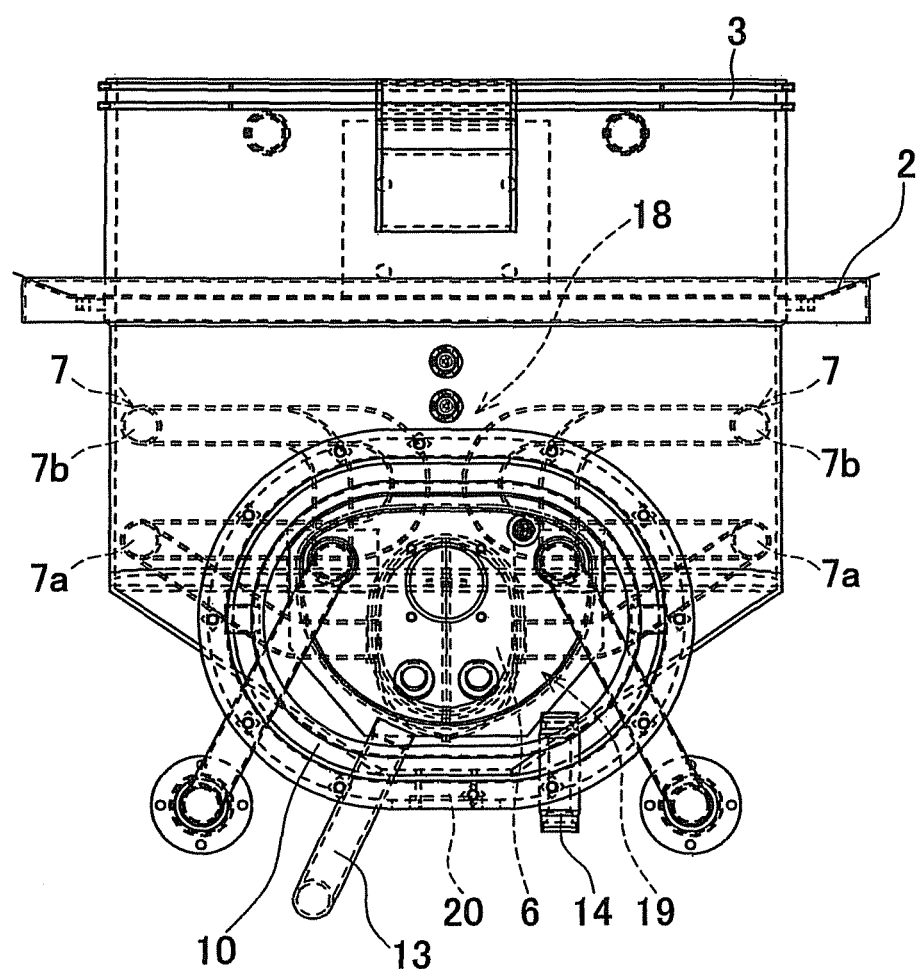
FIG. 5 is a front view of the oil bath unit.
Figure 6:
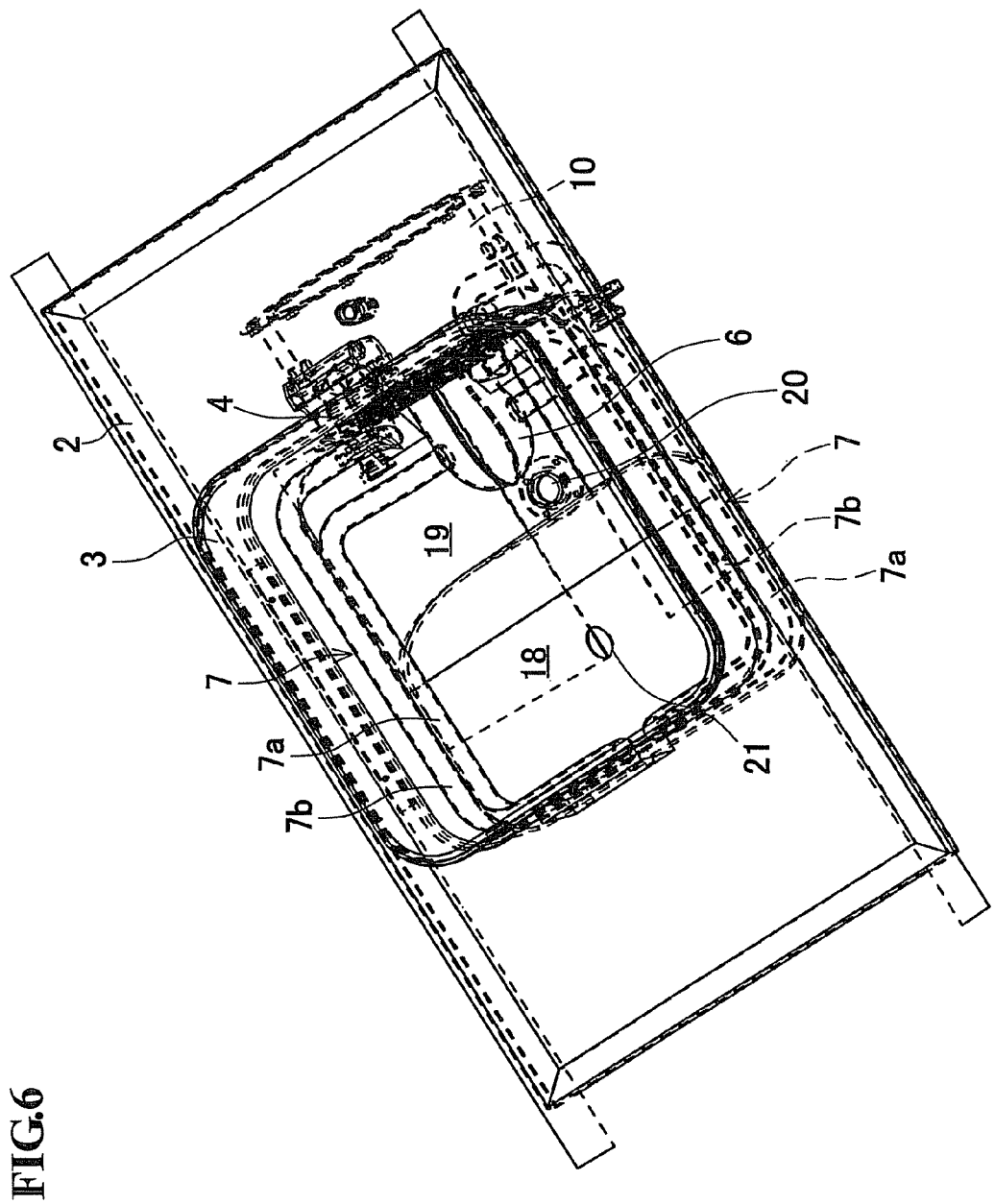
FIG. 6 is a perspective view of the oil bath unit as viewed from above.

FIG. 1 illustrates a pressure fryer that is an example of a fryer.

The pressure fryer 1 includes a housing 2, in which an oil bath 3 and a pulse combustor 4 are provided. The oil bath 3 is quadrangular shaped as viewed from above and filled with cooking oil. The pulse combustor 4 heats the cooking oil in the oil bath 3 and the pulse combustor 4 serves as heating device. Reference numeral 5 represents a lid that is provided on an upper end of the oil bath 3 and enables the oil bath 3 to be arbitrarily opened/closed.

The pulse combustor 4 has a combustion exhaust system including: a combustion chamber 6 that is provided on an inner surface on a front side (assuming that a left side of FIG. 1 is front) of the oil bath 3 and combusts a gas mixture of fuel gas and combusting air; a pair of left and right tail pipes 7 and 7 that discharge exhaust gas from the combustion chamber 6 and serve as an heat exchange part; decouplers 8 that are provided on both outsides of the oil bath 3 and connected to downstream sides of the tail pipes 7 and 7, respectively; and an exhaust pipe 9 that is connected to downstream sides of both of the decouplers 8 and 8 and installed upright so as to extend around behind the housing 2.

On the other hand, outside the oil bath 3 on the front side, an air chamber 10 is provided. An unillustrated mixing chamber is installed in the air chamber 10, which is communicatively connected to the combustion chamber 6 through a flapper valve. The combusting air flows from a fan 11 provided on a bottom surface of the housing 2, through a muffler 12 and an air supply pipe 13. Further, a gas conduit 14 is connected to the mixing chamber in the air chamber 10 and has a gas-supplying device 15 including a solenoid valve and a gas governor. The gas governor performs open/close control of a supply path of the fuel gas to the pulse combustor 4.

Reference numeral 16 represents an oil tank connected to a bottom part of the oil bath 3, and a filter is provided in the oil tank. After the cooking oil is transferred from the oil bath 3 to the oil tank 16, the oil is filtered in the oil tank with use of the filter and is returned to the oil bath 3 with a pump 17.

An upper part of the pressure fryer 1 is, as illustrated in FIGS. 2 to 6, formed as one unit including the oil bath 3, the pulse combustor 4, a top panel of the housing 2, and the like. In the following, on the basis of the unit, structures of the oil bath 3 and the pulse combustor 4 are described.

Firstly, the bottom part of the oil bath 3 is of a two-step bottom shape in which a front side has a deeper bottom than that of a rear side. In a shallow bottom part on an upper side, a cooking zone 18 is formed, while in a deep bottom side on a lower side, a cooking zone 18 and a cold zone 19 are formed. Regarding the pulse combustor 4, the combustion chamber 6 is arranged in the cold zone 19, whereas the tail pipes 7 and 7 are arranged in the cooking zone 18. Reference numeral 20 represents an oil drain pipe that is provided at the bottom of the cold zone 19 and connected to the oil tank 16. Reference numeral 21 represents an oil inlet that is provided at the bottom of the cooking zone, which is inclined forward and downward, and connected with a pipe from the pump 17.

Each of the tail pipes 7 includes: a forward pipe 7a that extends outward and obliquely upward from a left or right side surface of the combustion chamber 6 to reach an inside of the cooking zone 18, and then bends in a C-shape as viewed from above along an inner surface of the oil bath 3, which is divided into left and right halves; and a return pipe 7b that is mutually connected to the forward pipe 7a in a U-shape in the center of the inner surface on a rear side of the oil bath 3, bends above the forward pipe 7a in a C-shape as viewed from above parallel to the forward pipe 7a along the inner surface, which is divided into left and right halves, and in an upper left or right part of the combustion chamber 6, bends forward to return to the air chamber 10. That is, the tail pipes 7 and 7 in the cooking zone 18 are placed in a meandering shape so as to extend forward and backward once along the inner surface of the oil bath 3 in a circumferential direction of the oil bath 3.

In FIG. 1, reference numeral 22 represents a burner controller provided in a front side lower part of the housing 2. The burner controller 22 is connected with the solenoid valve of the gas-supplying device 15 and an unillustrated temperature sensor provided on the front side of the oil bath 3 in the cooking zone 18. On the basis of a temperature detection signal from the temperature sensor, the burner controller 22 performs ON/OFF control that opens/closes the solenoid valve of the gas supplying device 15 to intermittently combust the gas mixture in the combustion chamber 6 so as to keep an oil temperature in the oil bath 3 at a cooking temperature (e.g., 180° C. to 182° C.).

On the other hand, a fry controller 23 is provided in a front side upper part of the housing 2. The fry controller 3 has an operation button, a display part, and the like. By using the fry controller 23, a cooking mode, a heat retention mode, a cooking temperature, or the like can be set and an input instruction is issued to the burner controller 22.

In the pressure fryer 1 configured as described above, when the oil bath 3 is filled with the cooking oil, and a predetermined cooking mode is selected with the fry controller 23 to switch ON an operation switch, the burner controller 22 rotates the fan 11 for a predetermined period of time to supply air, and then intermittently combusts the gas mixture in the combustion chamber 6 to operate the pulse combustor 4. Specifically, an unillustrated ignition plug provided in the combustion chamber 6 is used to ignite and explosively combust the gas mixture in the combustion chamber 6. A pressure rise in the combustion chamber 6 following the combustion leads exhaust gas to be forcibly discharged into the tail pipes 7 and 7, and subsequently, the fuel gas and combusting air are sucked into the combustion chamber 6 that is depressurized by the exhaust gas discharge. Accordingly, the gas mixture is intermittently combusted. In order to operate the pulse combustor 4, intermittent combustion (ON/OFF operation) is repeated, or an input adjustment based on proportional control is made.

At this time, the exhaust gas discharged to each of the tail pipes 7 is sent backward along the inner surface of the oil bath 3 by the forward pipe 7a, and then returned again along the inner surface of the oil bath 3 by the return pipe 7b, whereby the exhaust gas travels forward and backward around the cooking zone 18 from left or right, and is exhausted above from the exhaust pipe 9 through the decoupler 8. Accordingly, the cooking oil in the cooking zone 18 is heated to the cooking temperature by the heat exchange between the forward pipes 7a and the return pipes 7b around the cooking zone 18. When, in this state, food materials are put into the oil bath 3 through a basket, and then the lid 5 is closed, the food materials are pressurized and cooked in the oil bath 3. As the cooking zone 18 is heated by exhaust gas through the tail pipes 7 and 7 surrounding the cooking zone 18, a temperature variation is unlikely to occur in the cooking zone 18. Even if depths or positions of the food materials in the cooking zone 18 are different, the food materials are uniformly heated and pressured/cooked.

Fry residues and the like produced from the food materials by the pressure cooking are dropped to the cold zone 19; however, no upward flow is generated in the cooking oil in the cold zone 19 because only the combustion chamber 6 is arranged in the cold zone 19 and a temperature is lower than that of the cooking zone 18. Therefore a risk that the fry residues are floated up from the cold zone 19 and attached to the food materials is reduced.

On the other hand, when the oil bath 3 is cleaned, only the combustion chamber 6 is arranged in the cold zone 19, and in the cooking zone 18, the center is also open due to a placement configuration of the tail pipes 7 and 7, so that the fry residues and oxide contaminations of the oil can be easily removed.

According to the pressure fryer 1 having the above configuration, the tail pipes 7 and 7 are placed along the inner surface of the oil bath 3, and in the oil bath 3, the cooking zone 18 in which the cooking oil is heated by the surrounding tail pipes 7 and 7 is formed. As a result, even in the case of placing the tail pipes 7 serving as the heat exchange part in the oil bath 3, the oil bath 3 can be easily cleaned, and also a temperature variation and the attachment of the fry residues and the like are unlikely to occur, so that pressure cooking having good quality can be done.

In particular, in the present embodiment, the heating means includes: the combustion chamber 6 that is provided in the oil bath 3 and combusts the gas mixture of the fuel gas and the combusting air; and the pulse combustor 4 that is connected to the combustion chamber 6 and includes the tail pipes 7 and 7 discharging the exhaust gas, and the tail pipes 7 and 7 are placed in the meandering shape so as to extend forward and backward once along the inner surface of the oil bath 3 in the circumferential direction of the oil bath 3, so that the cooking zone 18 can be more uniformly heated by the tail pipes 7 and 7 that extend around in the meandering shape in the oil bath 3.

On the lower side of the cooking zone 18 in the oil bath 3, the deep-bottomed cold zone 19 is formed, and the combustion chamber 6 is arranged in the cold zone 19, so that even in the case of using the pulse combustor 4 as the heating means, the combustion chamber 6 is not positioned in the cooking zone 18, and therefore the cooking zone 18 can be utilized as a heating region for food materials as much as possible. It is obvious that an inside of the cold zone 19 can also be easily cleaned.

It should be noted that, regarding the placement configuration of the tail pipes, the forward pipes and the return pipes may be replaced in vertical position by each other, or may be extended forward and backward in the meandering shape twice or more respectively on the left and right sides. The placement configuration is not necessary the meandering shape extending forward and backward in the circumferential direction of the oil bath, but can be modified. For example, the configuration is a meandering shape in which one of the forward pipe and the return pipe is extended forward and backward in the vertical direction, or the pair of left and right tail pipes may be modified one tail pipe that is extended around along the inner surface of the oil bath. It is obvious that the heat exchange part is not limited to the tail pipe, but depending on heating means, even a heat exchange part such as an electric heater or an immersion pipe burner can also be placed along the inner surface of the oil bath.

A configuration of the pressure fryer, even in the case of providing a pair of left and right oil bathes, it is only necessary to place heat exchange parts provided respectively for the oil bathes along inner surfaces of the respective oil bathes. Further, even in the case where the oil bath has a shape such as a circular shape, or an oval shape as viewed from above, the present invention can be applied, and it is only necessary to bend and form a heat exchange part such as a tail pipe along an inner surface of the oil bath to meet the shape of the oil bath. Besides, for example, the oil inlet may be provided on a back surface of the oil bath.

It is obvious that the present invention is not limited to a pressure fryer, but applicable even to a fryer having an oil bath not provided with a lid, such as open fryer.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A fryer comprising:
an oil bath container adapted to contain cooking oil; and
a heating device that is provided with a heat exchanger in the oil bath container to heat the cooking oil, wherein
the heat exchanger is positioned only along and adjacent to an inner surface of the oil bath container to form a cooking zone, wherein the cooking oil is heated by the surrounding heat exchanger, and wherein the oil bath container is defined in part by sidewalls and the heat exchanger is inwardly spaced from the sidewalls in the oil bath container.

2. The fryer according to claim 1, wherein
the heating device includes: a combustion chamber that is provided in the oil bath container and combusts a gas mixture of fuel gas and combusting air; and a pulse combustor that is connected to the combustion chamber and includes a tail pipe discharging exhaust gas, wherein the tail pipe defines the heat exchanger and has a meandering shape that extends forward and backward at least one time along the inner surface of the oil bath container in a circumferential direction thereof.

3. The fryer according to claim 2, wherein on a lower side of the cooking zone in the oil bath container, a deep-bottomed cold zone is formed, and the combustion chamber is arranged in the cold zone.

4. The fryer according to claim 1, wherein the entirety of the heat exchanger is positioned outside a central region of the oil bath container.

5. A fryer comprising:
an oil bath container adapted to contain cooking oil, and
a heating device provided with a heat exchanger in the oil bath container to heat the cooking oil, wherein
the heat exchanger is positioned only along and adjacent to an inner surface of the oil bath container and is arranged in two layers that are overlapped in a vertical direction to form a cooking zone, wherein the cooking oil is heated by the surrounding heat exchanger, and wherein the oil bath container is defined in part by sidewalls and the heat exchanger is inwardly spaced from the sidewalls in the oil bath container.

6. The fryer according to claim 1, wherein on a lower side of the cooking zone in the oil bath container, a deep-bottomed cold zone is formed, and a combustion chamber is arranged in the cold zone.

7. The fryer according to claim 5, wherein on a lower side of the cooking zone in the oil bath container, a deep-bottomed cold zone is formed, and a combustion chamber is arranged in the cold zone.

* * * * *